(12) United States Patent
Clark et al.

(10) Patent No.: US 6,763,665 B2
(45) Date of Patent: Jul. 20, 2004

(54) FOOD CHILLER WITH OPTIMIZED AIR FLOW

(75) Inventors: George A. Clark, Lewis Center, OH (US); Mark S. Thompson, Milwaukee, WI (US)

(73) Assignee: Delta T, LLC, Racine, WI (US)

( * ) Notice: Subject to any disclaimer, the term of this patent is extended or adjusted under 35 U.S.C. 154(b) by 20 days.

(21) Appl. No.: 10/192,229

(22) Filed: Jul. 10, 2002

(65) Prior Publication Data

US 2004/0006997 A1 Jan. 15, 2004

(51) Int. Cl.[7] .................................................. F25B 21/02
(52) U.S. Cl. ........................... 62/3.6; 62/3.2; 62/457.9; 62/407
(58) Field of Search ..................... 62/3.6, 3.62, 3.2, 62/3.3, 457.9, 407

(56) References Cited

U.S. PATENT DOCUMENTS

| | | |
|---|---|---|
| 2,446,686 A | 8/1948 | Behrens |
| 2,915,884 A | 12/1959 | Haushalter et al. |
| 3,040,539 A | 6/1962 | Gaugler |
| 3,555,848 A * | 1/1971 | Johnson ..................... 62/457.9 |
| 3,823,567 A | 7/1974 | Corini |
| 3,986,337 A | 10/1976 | Richard |
| 4,297,850 A | 11/1981 | Reed |
| 4,326,383 A | 4/1982 | Reed et al. |
| 4,472,945 A | 9/1984 | Cech et al. |
| 4,726,193 A | 2/1988 | Burke et al. |
| 4,823,554 A | 4/1989 | Trachtenberg et al. |
| 4,845,958 A | 7/1989 | Senda et al. |
| 5,042,258 A | 8/1991 | Sundhar |
| 5,111,664 A | 5/1992 | Yang |
| 5,209,069 A | 5/1993 | Newnan |
| 5,247,798 A | 9/1993 | Collard, Jr. |
| 5,315,830 A | 5/1994 | Doke et al. |
| 5,423,194 A | 6/1995 | Senecal |
| 5,431,021 A | 7/1995 | Gwilliam et al. |
| 5,456,164 A | 10/1995 | Bang |
| 5,598,713 A | 2/1997 | Bartilucci |
| 5,661,979 A | 9/1997 | DeBoer |
| 5,699,669 A | 12/1997 | Gebhard |
| 5,718,124 A | 2/1998 | Senecal |
| 5,771,709 A | 6/1998 | Smith |
| 5,782,094 A | 7/1998 | Freeman |
| 5,813,233 A | 9/1998 | Okuda et al. |
| 6,226,994 B1 | 5/2001 | Yamada et al. |
| 6,295,820 B1 | 10/2001 | Cauchy et al. |
| 6,308,519 B1 | 10/2001 | Bielinski |
| 6,351,951 B1 | 3/2002 | Guo et al. |
| 6,385,976 B1 | 5/2002 | Yamamura et al. |
| 6,658,858 B1 * | 12/2003 | Thompson et al. ........... 62/3.6 |

OTHER PUBLICATIONS

US 6,381,965, 5/2002, Ghoshal (withdrawn)

* cited by examiner

Primary Examiner—Melvin Jones
(74) Attorney, Agent, or Firm—Andrus, Sceales, Starke & Sawall (57) ABSTRACT

A food chiller including an enclosed container supported on a base receives a flow of cooling air from a Peltier effect thermoelectric module in the base through cool air inlet openings into the container. Air is returned from the container to the base by a fan mounted in the air duct system in communication with the cold sink of the thermoelectric device. In each of the disclosed embodiments, duct length is minimized and air flow into the container is optimized by air hole placement and orientation.

25 Claims, 10 Drawing Sheets

FOOD CHILLER WITH OPTIMIZED AIR FLOW

BACKGROUND OF THE INVENTION

The present invention relates to a device for chilling fresh fruit and other fresh food products and, more particularly, to an improved countertop fruit chiller utilizing a Peltier effect thermoelectric device.

Thermoelectric devices operating in accordance with the well know Peltier effect have been used as cooling/heating devices for many years. Such a thermoelectric device comprises an array of semiconductor couples connected electrically in series and thermally in parallel. The semiconductor couples are sandwiched between metalized ceramic substrates. When DC electric current is applied in series to the thermoelectric device, it acts as a heat pump with heat being absorbed on the cold side, thereby cooling it, while heat is dissipated at the other side. Reversing the current causes the direction of heat flow to be reversed. Attaching a heat sink and a cold sink to the respective hot and cold sides may enhance the efficiency of the thermoelectric device.

Peltier effect devices have long been used to provide coolers and/or heaters for keeping foods fresh or for warming foods for serving. It has also been found and is well known to use forced-air convection to aid in heat transfer. A small electric fan is typically used to circulate air past the cold sink and into and through a container for the food, while another fan moves ambient outside air across the heat sink to dissipate heat from it.

Although chillers for fresh fruit and other perishable food products are well known in the art, the market success of such devices has been limited. There appear to be a number of reasons for this lack of market success. One is the cost and heat transfer efficiency of the solid state thermoelectric modules. In addition, the need to provide circulation of cool air to attain the greatest cooling efficiency has led to complex duct systems which add substantially to the cost of the containers, typically made of molded plastic materials. A long air circulation duct system also results in heat loss and pressure drop, both of which decrease the efficiency or add to the product cost. Another issue with prior chillers is the distribution of the cool air amongst the food to be chilled. It is important to optimize the distribution pattern of the cool air and to optimize the time that the cool air remains within the food container area.

SUMMARY OF THE INVENTION

In accordance with the present invention, a chiller for fresh fruit or other perishable food products utilizes a construction which optimizes a cooling air flow and thus heat transfer efficiency with a container construction that is less expensive to manufacture and permitting the use of a relatively smaller thermoelectric module. Thermoelectric modules of increased efficiency, such as disclosed in U.S. Pat. No. 5,448,109 is particularly suitable for use in the fruit chiller of the subject invention.

In its broadest aspect, the food chiller of the present invention comprises a base housing for mounting a Peltier effect thermoelectric module sandwiched between a cold sink and an opposite heat sink. The housing also defines a duct system that includes a cool air supply duct in heat transfer communication with the cold sink, a return air duct, and a cool air circulation fan in the cooling duct system to circulate air therethrough.

A food container portion is adjacent the base housing and contains an enclosing sidewall and a removable or openable cover for retrieval of the food. The food container portion has therein a plurality of inlet and outlet holes that communicate with the duct system. The inlet and outlet holes are designed to optimize the air flow.

In one embodiment these holes are oriented such that the cold airflow is induced into a circular swirling pattern. The swirling movement of the airflow helps maximize the time that cold air is in contact with the enclosed food thus improving the cooling efficiency.

In another embodiment, the cold air openings are oriented to direct the airflow away from the return air duct thus increasing the length of time the air is circulated within the food container area. The design is not restricted to these configurations as other airflow optimization patterns are also possible. The object of this invention is optimization of the airflow while minimizing manufacturing costs.

In one overall embodiment, the housing containing the thermoelectric device and duct system is separable from the food-containing portion. This embodiment allows for easy removal of the food container portion for cleaning, but requires a redundant wall at the interface of the housing and food container.

The top of the base may have holes that line up with holes in the bottom of the food container. To control the airflow rate into the food container, the food container may be rotated relative to the base thereby partially blocking the food container airflow holes.

In another overall embodiment, the housing containing the thermoelectric device and duct system is integrated with the food-containing portion thus requiring a single wall separating the two compartments. This approach minimizes manufacturing costs by minimizing the required number of components.

The food container portion is normally closed with a removable or openable cover such that cooling air is continuously recirculated. In one embodiment, however, an outside ambient air supply conduit communicates with the cooling duct system and includes a metering device to admit a controlled flow of outside air to assist in purging the cooling duct system of ethylene gas and other ripening by-products of fruit. The metering device may comprise a small diameter tube connected to the duct system upstream of the fan.

In another overall embodiment the housing containing the thermoelectric device also contains a tower comprising a portion of the duct system. Inlet air holes in the top of the tower help assure that the recirculated cold air flows to the top of the food container. To maintain a short duct length, the air out-flow holes are located near the base of the tower. The air out-flow holes are oriented such that the out-flowing air is directed toward the periphery of the food container.

To help maintain the interior temperature of the container, a removable insulating sleeve may be inserted into the container. The sleeve is shaped to conform to the interior of the enclosing sidewall. The removable cover may also be provided with an insulating liner.

Various arrangements of partitions may be placed within the container to divide the container into different temperature zones by varying the flow of cooling air through the zones. Such partitions may be vertically disposed to extend upwardly from the container bottom wall or may be horizontally disposed and attached, for example, to a central tower or to the container sidewall.

DETAILED DESCRIPTION OF THE PREFERRED EMBODIMENT

Figure 1:
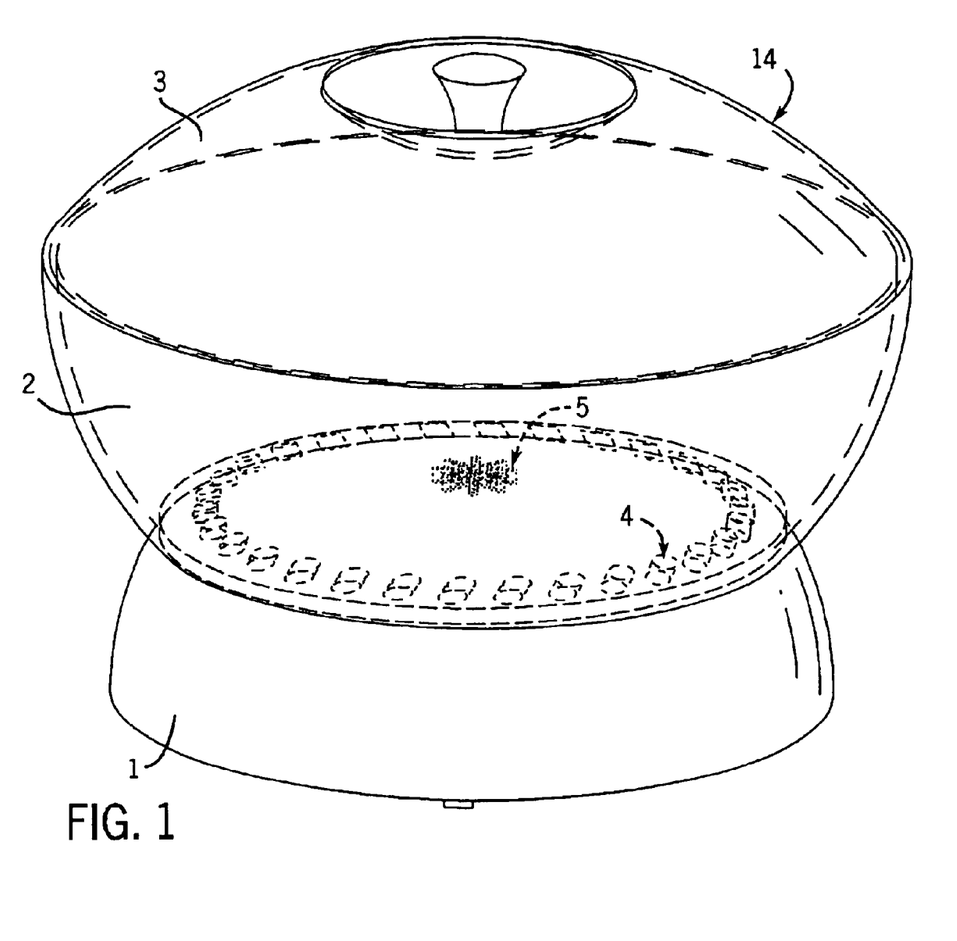
FIG. 1 is a perspective view showing the general arrangement of the fruit chiller of the subject invention.

In FIG. 1, there is shown a fruit chiller 14 in accordance with one embodiment of the present invention. The fruit chiller includes a supporting base 1 for supporting the chiller on a horizontal surface. There is space inside the base for housing various components of the cooling system, which will be described in detail herein. A removable container 2 is seated on base 1. A removable cover 3 provides access to the food to be preserved. Inside of container 2 are a plurality of inlet holes 4 for distributed flow of the cold air into the container. Centrally located outlet holes 5 provide a return path for the air. Upon passing through holes 5, the air is again cooled and discharged through holes 4. While this is a preferred embodiment it is also possible to reverse the airflow thus using holes 5 as inlet ports and holes 4 as outlet air ports. The base 1, container 2 and removable cover 3 may all be made of injection molded plastic materials. The base 1 is preferably opaque and the container 2 and cover 3 transparent.

Figure 2:
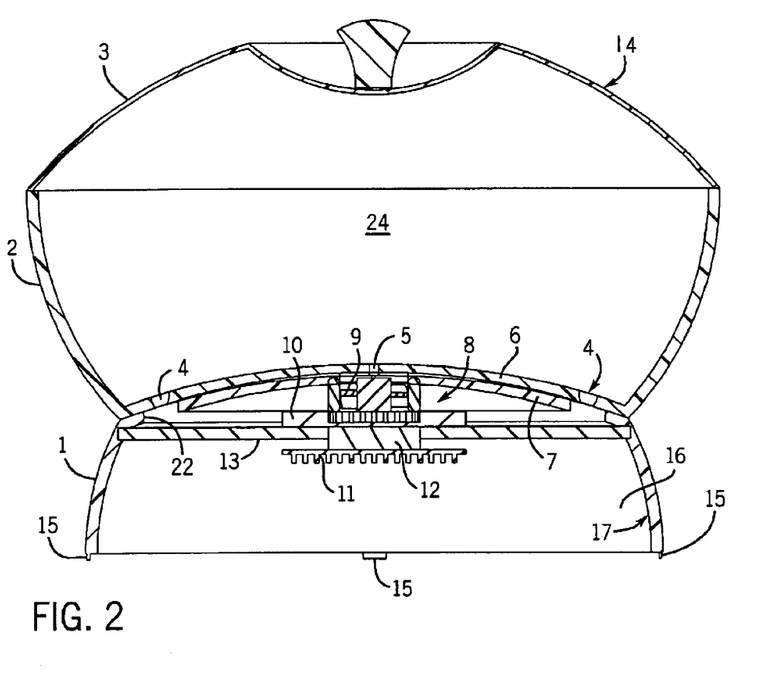
FIG. 2 is a vertical section through the fruit chiller shown in FIG. 1.
Figure 3:
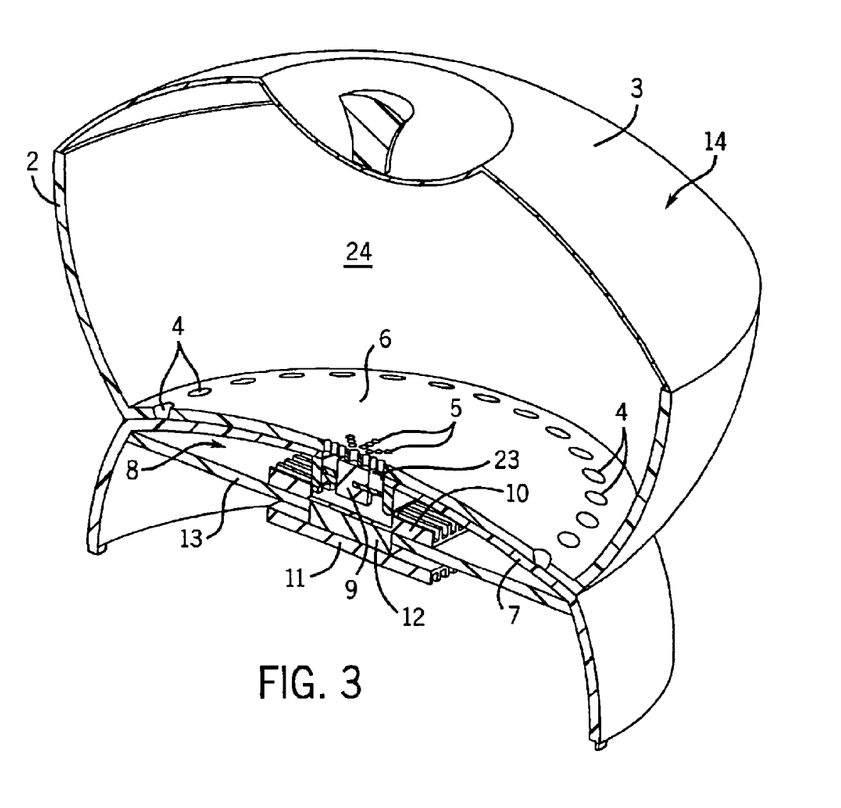
FIG. 3 is a perspective view of the fruit chiller cut in half for viewing of the interior components.
Figure 4:
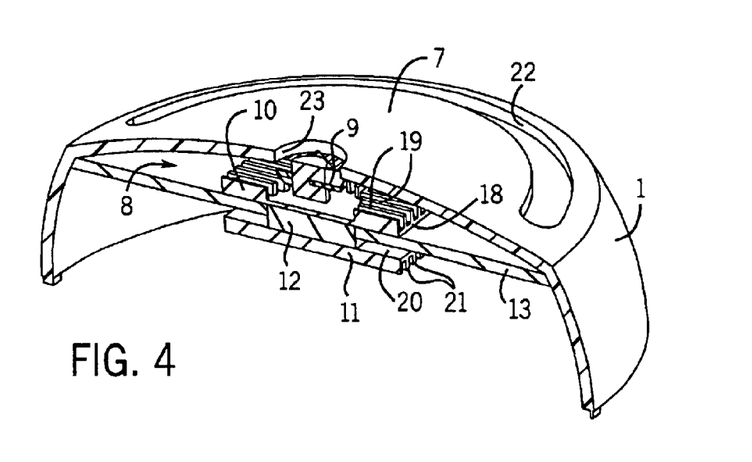
FIG. 4 is a perspective view of FIG. 3 with the food container and cover removed.
Figure 5:
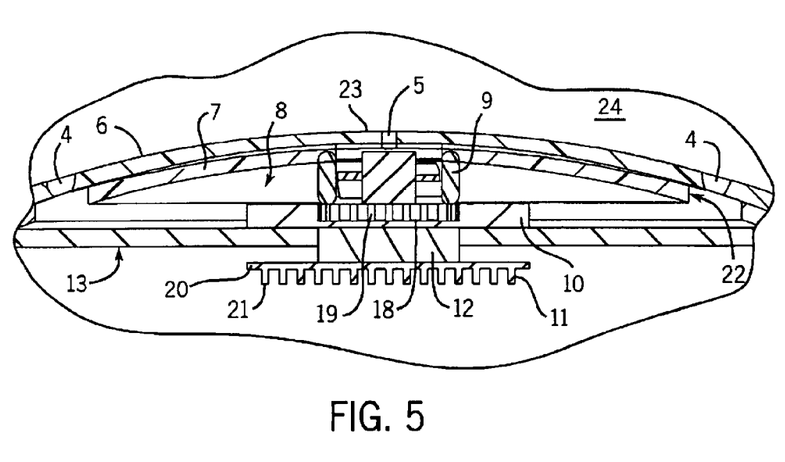
FIG. 5 is a detailed view of the section of FIG. 2.

Referring also to FIGS. 2 and 5, the base 1 is suitably supported on legs 15 to provide an open space beneath the base for the entry of ambient cooling air. The lower interior of base 1 defines a substantially open ambient air chamber 16 defined generally by base side walls 17 and a base baffle plate 13.

The container 2 and the food products contained therein are cooled with thermoelectric module 12 utilizing the well-known Peltier effect. The thermoelectric module 12 is mounted in the base baffle plate 13 and positioned generally horizontally in the plane of baffle plate 13. By applying a DC current to the module, heat will be absorbed at one face (in this case the upper side of 12), thereby cooling it. Heat will be dissipated at the other face of the module (in this case the lower side of 12), thereby heating it. As is also well known in the prior art, a cold sink 10 is attached to the upper face and a heat sink 11 is attached to the lower face of the module. The cold sink 10 is typically made of aluminum and includes a base plate 18 and a series of closely spaced fins 19.

Similarly, the heat sink 11 includes an aluminum base plate 20 and integral closely spaced fins 21. The heat rejected by the operating thermoelectric module 12 at the heat sink 11 is dissipated by a flow of ambient air through the ambient air chamber 16.

The upper wall 7 of base 1 supports the lower wall 6 of the container 2. Holes 4 in the container are in fluid communication with arcuate slots 22 in the base upper wall 7, and holes 5 in the container are in fluid communication with holes 23 in the base upper wall 7. The space 8 between the upper base wall 7 and the base baffle 13 represents a duct system that is in fluid communication with the container interior 24 via holes 4 and slots 22, and holes 5 and 23. A fan 9 draws air in through holes 5 and 23. As the air is exhausted from the lower portion of fan 9 it passes over cold sink 10, into duct system 8 and reenters the container interior 24 via slots 22 and 4. Thus the air within container interior 24 is recirculated and cooled.

In another embodiment, the inflow of chilled air into the container interior 24 may be modulated. With a chiller construction in which the base upper wall 7 and the lower container wall 6 are generally circular in shape, the arcuate slots 22 in the base upper wall 7 may be replaced with a circular array of holes sized and spaced to align directly with the holes for in the lower wall 6 of the container. Full air flow into the container takes place when the holes in base upper wall 7 and the container lower wall 6 are completely aligned. However, slight rotation of the container relative to the base will partially close the alignment and result in a reduction in air flow.

Figure 6:
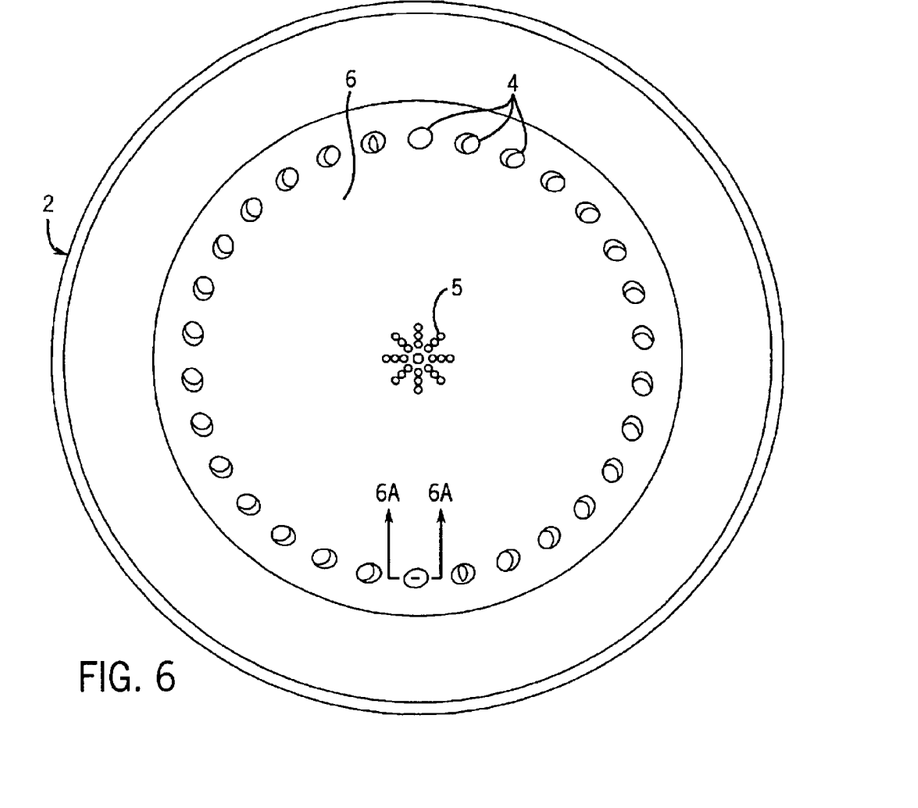
FIG. 6 is a top view of the fruit chiller with the cover removed.
Figure 6A:
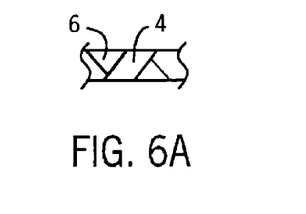
FIG. 6A is a sectional detail taken on line 6A—6A of FIG. 6.

Holes 4 in container 2 are shaped to optimize the flow of the chilled air. In one embodiment shown in FIG. 6, holes 4 are oriented such that the out-flowing chilled air will induce a counter-clockwise swirl pattern. The swirl pattern tends to increase the time the chilled air is in contact with the fruit thus improving cooling efficiency.

Figure 7:
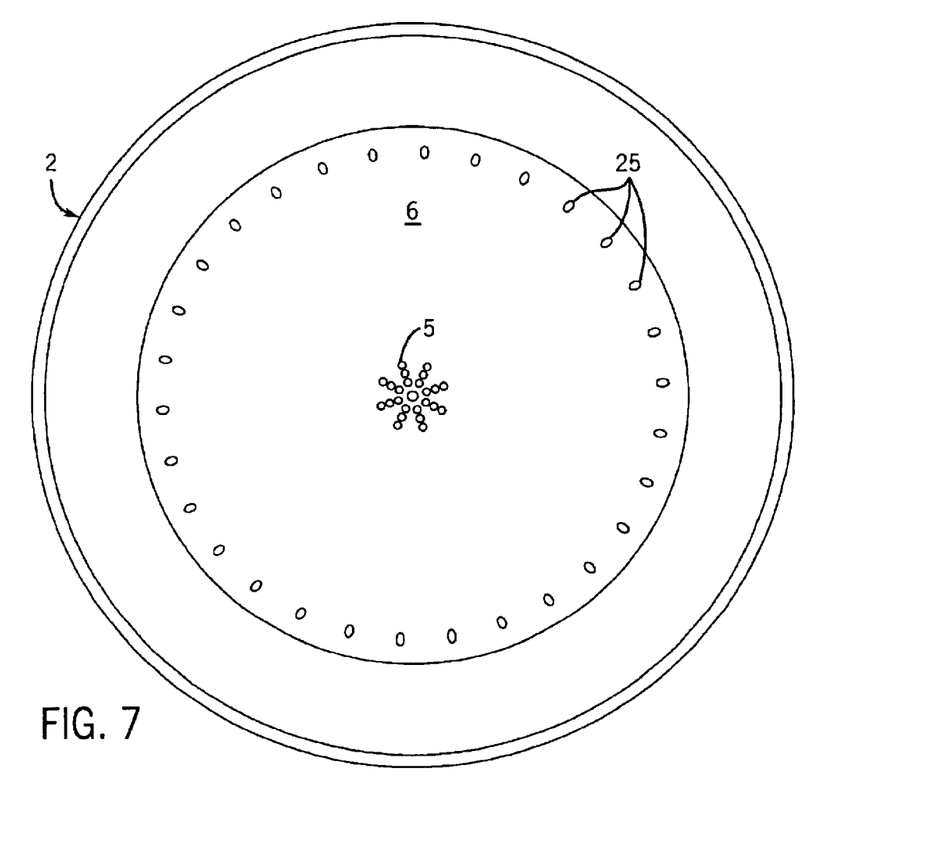
FIG. 7 is a top view of the fruit chiller with the cover removed showing an alternate embodiment of the invention.
Figure 8:
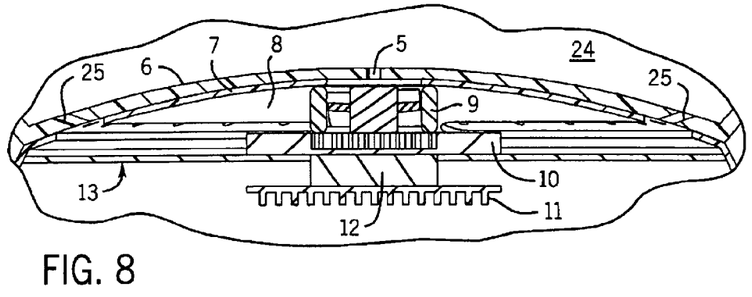
FIG. 8 is a vertical sectional detail through the fruit chiller of FIG. 7.

In another embodiment shown in FIG. 7, holes 25 are oriented such that the out-flowing chilled air is forced in a direction away from holes 5 thus increasing the time the chilled air remains in the container interior 24. FIG. 8 illustrates a section through the outward oriented holes 25.

The invention is not limited to the two hole orientations described above, as other optimization geometries are also possible.

Figure 9:
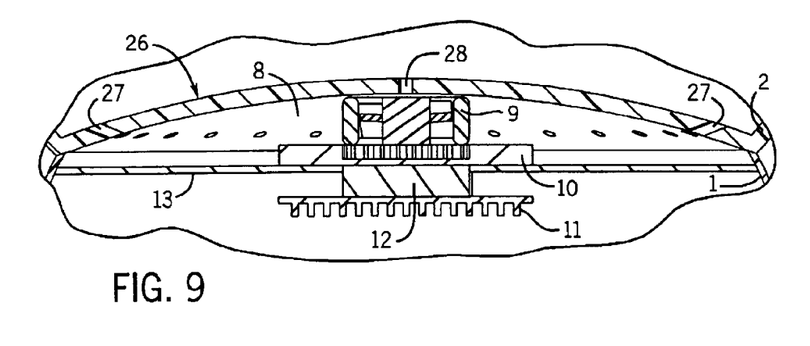
FIG. 9 is a vertical section of the fruit chiller showing an alternate embodiment of the invention.

In another cost saving embodiment, container 2 is not removable from base 1. The bottom of container 2 is shared with the upper wall of base 1. FIG. 9 shows a vertical section through a fruit chiller of this alternate configuration. Wall 26 is common between container interior 24 and duct system 8. Chilled air is distributed into chamber 24 via inlet holes 27 and returned to duct system 8 via holes 28. The orientation of holes 27 is such that the airflow into the container interior 24 is optimized.

In a variation of the FIG. 9 embodiment, the common wall 26 is formed as part of the container 2 which is separable from the base. Thus, when the container is lifted from the base, the duct system is opened. In one variant of this embodiment, the return outlet air flow from the container into the duct system is through the holes 28 in the center of container bottom wall 26, or the holes 28 may be provided in a small circular plate forming part of the housing for the fan 9. In this latter arrangement, the container bottom wall is provided with a central circular opening that surrounds the small circular plate when the container is placed on the base.

Figure 10:
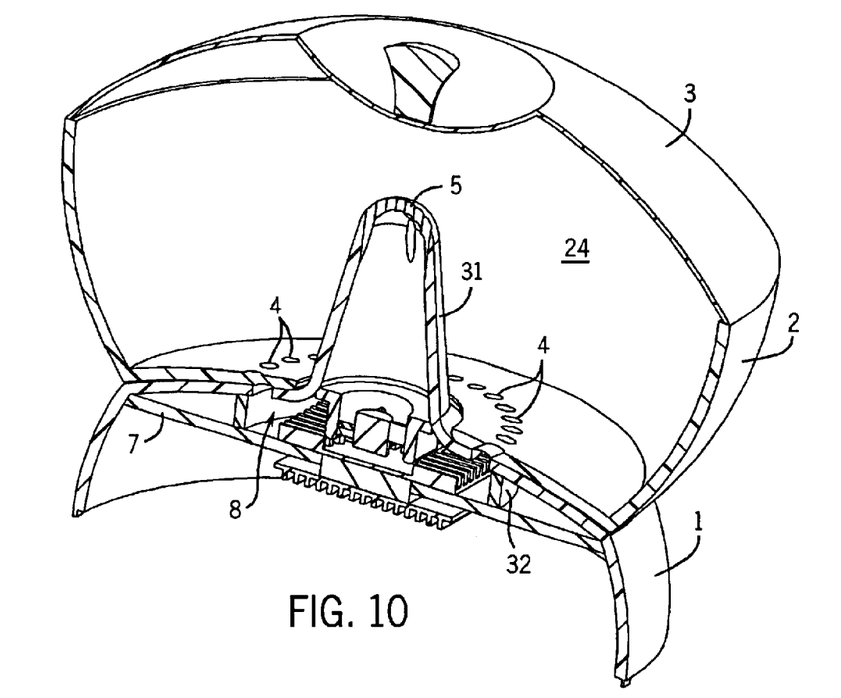
FIG. 10 is a perspective view of the fruit chiller showing an alternate embodiment cut in half for viewing of the interior components.
Figure 11:
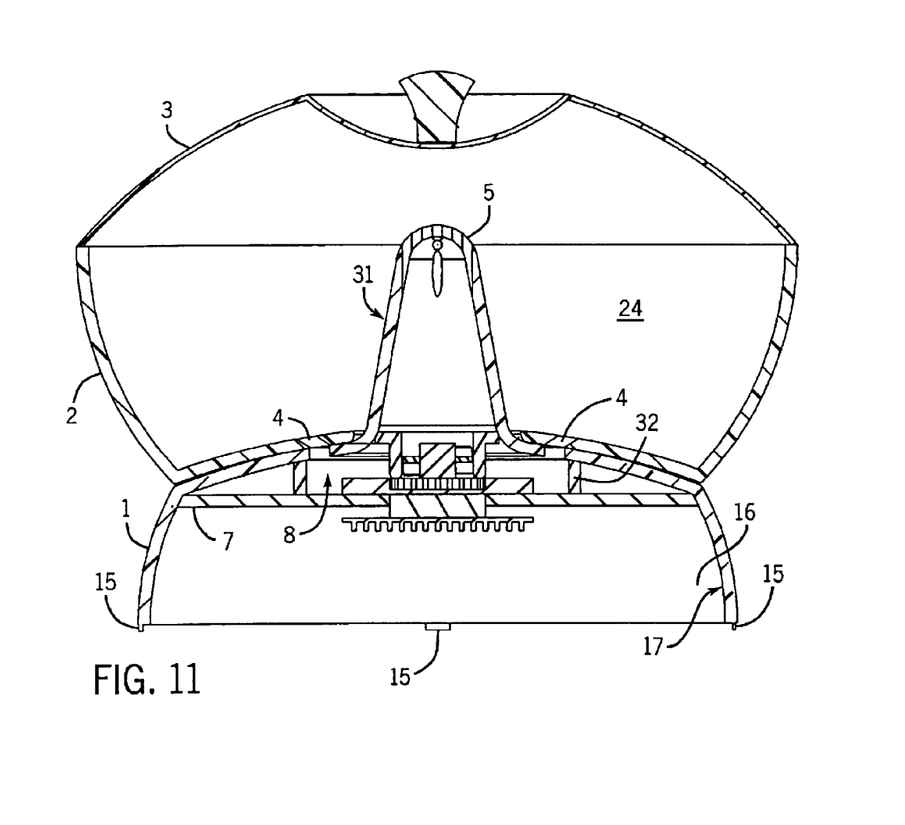
FIG. 11 is a vertical section through the fruit chiller shown in FIG. 10.

In another embodiment shown in FIGS. 10 and 11, tower 31 is an integral part of base housing 1. Air inlet holes 5 are located at the top of tower 31. Inlet holes 4 are located in the bottom wall of food container 2 and are oriented such that the outflowing cold air is directed upwardly and outwardly toward the periphery of food container 2. This overall embodiment assures that cold air will circulate to the top of food container area 24 yet maintains a short duct length by virtue of the optimized shape and positioning of holes 4. The return portion of the duct system 8, receiving air via holes 5, is preferably shortened by an intermediate barrier wall 32.

Figure 12:
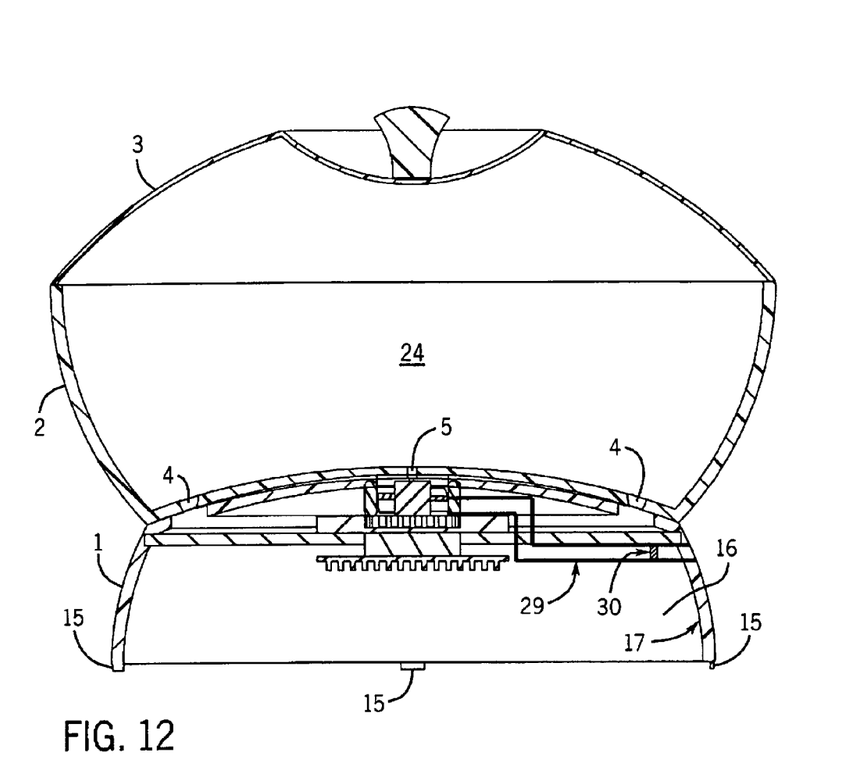
FIG. 12 is a vertical section of the fruit chiller showing an alternate embodiment of the invention.

Ripening fruit is known to emit ethylene gas and other by-products of organic decomposition. It may be desirable to exhaust these gasses by regular or periodic replacement of the cooling air recirculating within the container interior 24. Referring particularly to FIG. 12, an ambient air conduit 29 comprising a small diameter metering tube extends from the side wall 17 of the base into the duct system 8 where a small volume flow of ambient outside air is drawn in by the cold sink fan 9 and mixed with the recirculated cooling air. As shown, the ambient air conduit 29 opens into the duct system 8 just upstream of the inlet to the fan 9. It is believed, however, that the conduit could connect to the duct system at another location therein. The inflow of ambient air may be regulated with the use of an optional pinch valve or metering valve 30 at the inlet end of the conduit 29. To provide for the corresponding exhaust of ethylene and other gaseous by-products, it is preferred to provide a small leak between the container 2 and the cover 3, however, a manually adjustable vent slot may also be used. The slot could be located in either the container wall 2 or the cover 3.

As indicated previously, the thermoelectric module 12 is normally configured so the upper face is cold while the lower face is hot. Because reversal of the polarity of the supplied current to the thermoelectric module causes the direction of heat flow to be reversed, the fruit chillers of either of the embodiments described herein may also be utilized to warm the fruit to promote or enhance ripening. In this alternate configuration the upper face of the thermoelectric module 12 is hot while the lower face is cold.

Certain fruits may often be purchased in a green or semi-ripe condition. One example is bananas which are often purchased in some semi-ripe condition and allowed to ripen in the open air. By reversal of the supplied current to the thermoelectric module 12, a green or semi-ripe fruit may be ripened more quickly by warming and, when ripe, preserved for a longer time by again reversing the current to provide a cooling air supply to the container 24.

In general, temperature control is an excellent, and by far the best means, of controlling ripening in fruit. As discussed above, warming may be used to enhance and promote ripening of green or semi-ripe fruit, but after the fruit has ripened, cooling is the best means available to slow the biological ripening processes and preserve the fruit for a longer period of time.

The direction of heat transfer of the thermoelectric module 12 can be reversed as mentioned above. The level of heating and cooling can also be controlled by control of the level of supplied current and voltage. In this manner, the user may, for example, select a set point to ripen fruits at a desirable rate or, conversely, a cooling set point to maintain ripened fruit at a temperature found to make the fruit most palatable. Other cooling or warming strategies may also be utilized, either with manual settings by the user or by using programmed microprocessor control.

We claim:

1. A food chiller comprising:
   a supporting base including a housing having an upper base wall;
   a Peltier effect thermoelectric device disposed in the housing between a cold sink and a hot sink;
   an enclosed container positioned adjacent to the housing and having a lower container wall positioned adjacent to and in contact with the upper base wall of the supporting base, the lower container wall and upper base wall having openings for inflow and outflow of air to and from the container;
   a duct system for distributing the inflow and outflow of air, said duct system enclosing the cold sink and including at least one of an air inlet space and an air outlet space providing flow communication through said openings between said cold sink and said container;
   a fan mounted in said duct system to generate said inflow and outflow of air; and,
   the openings in the upper base wall and lower container wall oriented to provide a maximum time of air residence within the container.

2. The apparatus as set forth in claim 1 wherein said duct system defines a flow path having an overall length less than the length of the adjacent interface between the housing and the container.

3. The apparatus as set forth in claim 1 wherein the air outflow openings are oriented to direct the air flow into the container in a direction away from the air inflow openings.

4. The apparatus as set forth in claim 1 including a central tower extending into the container and forming a portion of the duct system, said tower having a fixed base end connected to the remainder of the duct system and a free opposite end.

5. The apparatus as set forth in claim 4 wherein said air inflow openings are located in the free end of the tower, said air outflow openings located in a lower wall of the container and oriented to direct air radially toward the outer periphery of the container.

6. The apparatus as set forth in claim 5 wherein said outflow openings are positioned directly adjacent the base end of the tower.

7. The apparatus as set forth in claim 4 wherein said air outflow openings are located in the free end of the tower, said inflow openings located in a lower wall of the container and oriented to direct air radially toward the outer periphery of the container.

8. The apparatus as set forth in claim 7 wherein said inflow openings are positioned directly adjacent the base end of the tower.

9. The apparatus as set forth in claim 1 comprising a conduit connecting the duct system to ambient outside air.

10. A food chiller as set forth in claim 1 and further comprising:
    a housing base baffle plate forming a lower wall of said duct system; and,
    said lower container wall including at least one of said air inflow and air outflow openings.

11. The apparatus as set forth in claim 10 wherein said one opening in said lower container wall are disposed near the radial outer periphery thereof.

12. The apparatus as set forth in claim 11 wherein the other of said openings are disposed in the center of the lower container wall.

13. The apparatus as set forth in claim 11 wherein the fan includes a fan housing mounted in the center of said baffle plate, and the other of said openings are disposed in said fan housing.

14. The apparatus as set forth in claim 10 wherein said lower container wall includes said air inflow and said air outflow openings.

15. The apparatus as set forth in claim 10 wherein said air outflow openings are oriented to induce a swirl pattern in the air flow within the container.

16. The apparatus as set forth in claim 10 wherein the air outflow openings are oriented to direct the air flow into the container in a direction away from the air inflow openings.

17. The apparatus as set forth in claim 10 comprising a conduit connecting the duct system to ambient outside air.

18. The apparatus as set forth in claim 1 including control means for said thermoelectric device for controlling the air flow temperature.

19. The apparatus as set forth in claim 18 wherein said control means comprises means for reversing the polarity of the current supplied to the thermoelectric device.

20. The apparatus as set forth in claim 18 wherein said control means comprises means for controlling the magnitude of current and voltage supplied to the thermoelectric device.

21. A food chiller comprising:
a supporting base including a housing;
a Peltier effect thermoelectric device disposed in the housing between a cold sink and a hot sink;
an enclosed food container positioned adjacent to the housing and having openings for an inflow of air and an outflow of air;
a duct system for distributing the inflow and outflow of air, said duct system enclosing the cold sink and including at least one of an air inlet space and an air outlet space providing flow communication through said openings between said cold sink and said food container and including portions of at least one of a housing wall and a container wall;
a fan mounted in said duct system to generate said inflow and outflow of air; and,
the openings in the container oriented to provide a maximum time of air residence within the container;
wherein the air outflow openings are oriented to induce a swirl pattern in the air flow within the container.

22. A food chiller comprising:
a supporting base including a housing;
a Peltier effect thermoelectric device disposed in the housing between a cold sink and a hot sink;
an enclosed food container positioned adjacent to the housing and having openings for an inflow of air and an outflow of air;
a duct system for distributing the inflow and outflow of air, said duct system enclosing the cold sink and including at least one of an air inlet space and an air outlet space providing flow communication through said openings between said cold sink and said food container and including portions of at least one of a housing wall and a container wall;
a fan mounted in said duct system to generate said inflow and outflow of air; and,
the openings in the container oriented to provide a maximum time of air residence within the container;
a generally circular upper base wall enclosing the base;
a generally circular lower container wall adapted to be supported on the upper base wall; and
the air inflow openings including aligned patterns of openings in said upper base wall and lower container wall providing maximum air flow in an aligned position;
wherein said container is rotatable on and relative to said upper base wall to reduce the air flow from the maximum.

23. A food chiller comprising:
a supporting base including a housing;
a Peltier effect thermoelectric device disposed in the housing between a cold sink and a hot sink;
an enclosed food container positioned adjacent to the housing and having openings for an inflow of air and an outflow of air;
a duct system for distributing the inflow and outflow of air, said duct system enclosing the cold sink and including at least one of an air inlet space and an air outlet space providing flow communication through said openings between said cold sink and said food container and including portions of at least one of a housing wall and a container wall;
a fan mounted in said duct system to generate said inflow and outflow of air;
the openings in the container oriented to provide a maximum time of air residence within the container;
a conduit connecting the duct system to ambient outside air; and
a valve in said conduit to control the flow of ambient outside air.

24. A food chiller comprising:
a supporting base including a housing;
a Peltier effect thermoelectric device disposed in the housing between a cold sink and a hot sink;
an enclosed food container positioned adjacent to the housing and having openings for an inflow of air and an outflow of air;
a duct system for distributing the inflow and outflow of air, said duct system enclosing the cold sink and including at least one of an air inlet space and an air outlet space providing flow communication through said openings between said cold sink and said food container and including portions of at least one of a housing wall and a container wall;
a fan mounted in said duct system to generate said inflow and outflow of air;
the openings in the container oriented to provide a maximum time of air residence within the container; and
an exhaust vent from the interior of the container.

25. The apparatus as set forth in claim 24 wherein said vent comprises an adjustable slot in the container or the cover.

* * * * *